United States Patent Office 3,249,628
Patented May 3, 1966

3,249,628
$\Delta^{1,3}$ - ANDROSTADIENE-3,17$\beta$-DIOL-3-BENZYL ETHER AND PROCESS FOR THE PRODUCTION THEREOF
Rudolf Wiechert, Berlin-Lichterfelde, Germany, assignor to Schering AG, Berlin, Germany
No Drawing. Filed Feb. 12, 1964, Ser. No. 344,199
Claims priority, application Germany, Mar. 27, 1963, Sch 33,023
10 Claims. (Cl. 260—397.5)

The present invention relates to new strongly anti-androgenic steroids, and to the production and use thereof, and more particularly to certain androstadiene compounds which have an extremely strong anti-androgenic action.

It is a primary object of the present invention to provide new anti-androgenic compounds.

It is another object of the present invention to provide a method of producing these new compounds.

It is still another object of the present invention to provide for the use of these compounds to achieve an anti-androgenic action.

Other objects and advantages of the present invention will be apparent from a further reading of the specification and of the appended claims.

With the above and other objects in view, the present invention mainly comprises a compound of the formula:

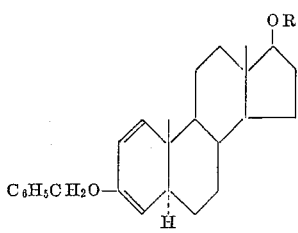

wherein R is selected from the group consisting of hydrogen and acyl wherein the acyl is derived from a lower aliphatic carboxylic acid.

The free alcohol, namely $\Delta^{1,3}$-androstadiene-3,17$\beta$-diol-3-benzyl ether has the following structural formula:

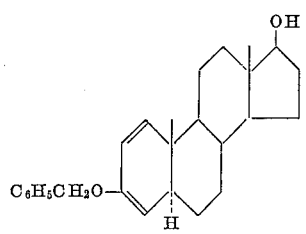

The benzylenol ethers of the present invention are advantageously produced by the action of benzyl alcohol in the presence of an alkali metal hydroxide, most preferably potassium hydroxide, on $\Delta^1$-androstene-17$\beta$-ol-3-one or its 17-ester, resulting in the formation of $\Delta^{1,3}$-androstadiene-3,17$\beta$-diol-3-benzyl ether, which, if desired, can be acylated to form the corresponding 17-ester. The reaction proceeds in accordance with the following reaction mechanism:

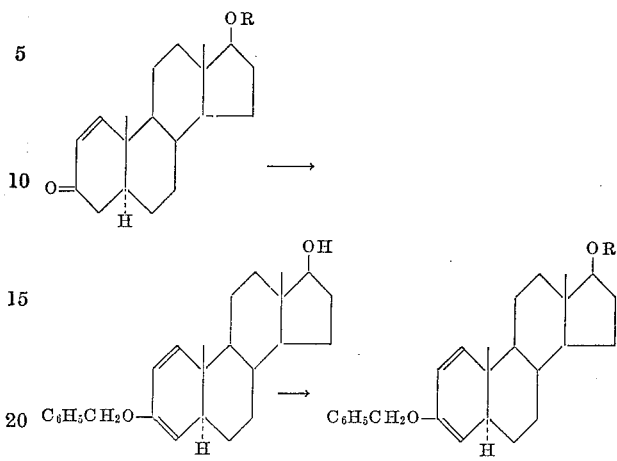

In the above formulas R has the same definition as previous.

The above reaction is quite unexpected since $\alpha,\beta$-unsaturated ketones in other cases under comparable conditions add the benzyl alcohol onto the $\alpha,\beta$-position carbon-carbon double bond, whereby the benzyloxy radical enters onto the $\beta$-position carbon atom. Thus, for example, 16$\alpha$-benzyloxy-20-ketosteroids are formed in this manner from $\Delta^{16}$-20-ketosteroids [H. Hirschmann, Journ. Amer. Chem. Soc., volume 74 (1952), page 539].

The reaction according to the present invention is also quite unique since methyl alcohol, ethyl alcohol and cyclohexanol do not react with $\Delta^1$-3-ketosteroids analogously to the reaction thereof with benzyl alcohol in accordance with this invention.

The 3-benzylenol ethers of $\Delta^1$-androstene-17$\beta$-ol-3-one and its 17-esters, of the present invention ($\Delta^{1,3}$-androstadiene-3,17$\beta$-diol-3-benzyl ether and its 17-esters) have been found to have extremely strong anti-androgenic steroid activity. Thus, in the anti-androgenic test, the 3-benzylenol ether of the present invention is required in an amount equal to only 10 times the amount of the used testosterone propionate in order to counter the effect of the testosterone propionate on the seminal vesicle and the prostate of castrated male rats. In the case of the anti-androgenic agnets known in the literature, which are mainly only variations of estrogen, it is necessary in order to achieve the same effect to use 100 to 300 times the amount. In the case of progesterone, in order to achieve the same effect on the prostate it is necessary to use 100 times the amount, and to achieve the same effect on the seminal vesicle it is necessary to use 30 times the amount.

The following examples are given to further illustrate the present invention. The scope of the invention is not, however, meant to be limited to the specific details of the examples.

*Example I*

5 g. of $\Delta^1$-androstene-17$\beta$-ol-3-one-17-acetate are dissolved in 150 cc. of benzyl alcohol, mixed with 4.41 g. of potassium hydroxide and heated for 3 hours under nitrogen at a temperature of 100° C. The reaction mass is then diluted with ether, the ethereal solution is washed with water until neutral, concentrated and steam distilled. The residue is then taken up in methylene chloride, the organic phase is dried with sodium sulfate and concentrated to dryness. The residue is recrystallized several times from acetone. There is thus obtained 1.04 g. of $\Delta^{1,3}$-androstadiene-3,17$\beta$-diol-3-benzyl ether having a melting point of 191–192° C.

UV: $\epsilon_{205}=6320$; $\epsilon_{223}=6540$; $\epsilon_{291}=17150$

*Example II*

757 mg. of $\Delta^{1,3}$-androstadiene-3,17$\beta$-diol-benzyl ether are heated with 3 cc. of pyridine and 2 cc. of acetanhydride for 90 minutes at 100° C. The reaction mixture is then stirred into ice water, and resulting precipitate is filtered off under suction, washed with water and dried. Upon recrystallization from ethyl acetate there is obtained 600 mg. of $\Delta^{1,3}$-androstadiene-3,17$\beta$-diol-3-benzyl ether-17-acetate having a melting point of 216.5–218° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. $\Delta^{1,3}$-androstadiene-3,17$\beta$-diol-3-benzyl ether.
2. $\Delta^{1,3}$-androstadiene-3,17$\beta$-diol-3-benzyl ether-17-acylate wherein the acylate is derived from a lower aliphatic carboxylic acid.
3. $\Delta^{1,3}$-androstadiene-3,17$\beta$-diol-3-benzyl ether-17-acetate.
4. A compound of the formula:

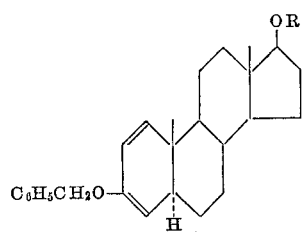

wherein R is selected from the group consisting of hydrogen and acyl wherein acyl is derived from a lower aliphatic carboxylic acid.

5. The method which comprises reacting a compound of the formula:

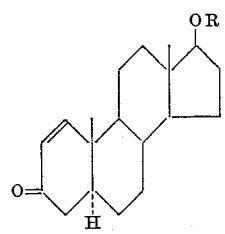

wherein R is selected from the group consisting of hydrogen and acyl wherein acyl is derived from a lower aliphatic carboxylic acid with benzyl alcohol in the presence of an alkali metal hydroxide, thereby forming $\Delta^{1,3}$-androstadiene-3,17$\beta$-diol-3-benzyl ether.

6. The method which comprises reacting a compound of the formula:

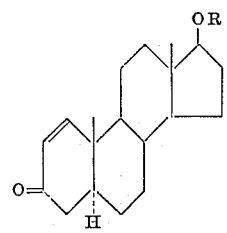

wherein R is selected from the group consisting of hydrogen and acyl wherein acyl is derived from a lower aliphatic carboxylic acid with benzyl alcohol in the presence of potassium hydroxide, thereby forming $\Delta^{1,3}$-androstadiene-3,17$\beta$-diol-3-benzyl ether.

7. The method which comprises reacting a compound of the formula:

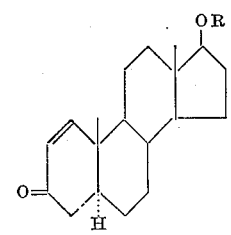

wherein R is selected from the group consisting of hydrogen and acyl wherein acyl is derived from a lower aliphatic carboxylic acid with benzyl alcohol in the presence of an alkali metal hydroxide, thereby forming $\Delta^{1,3}$-androstadiene-3,17$\beta$-diol-3-benzyl ether; and acylating the thus formed $\Delta^{1,3}$-androstadiene-3,17$\beta$-diol-3-benzyl ether in 17-position thereof with a lower aliphatic carboxylic acid, thereby forming the corresponding $\Delta^{1,3}$-androstadiene-3,17$\beta$-diol-3-benzyl ether-17-acylate.

8. The method which comprises reacting a compound of the formula:

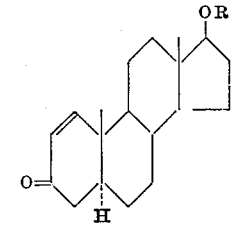

wherein R is selected from the group consisting of hydrogen and acyl wherein acyl is derived from a lower aliphatic carboxylic acid with benzyl alcohol in the presence of potassium hydroxide, thereby forming $\Delta^{1,3}$-androstadiene-3,17$\beta$-diol-3-benzyl ether; and acylating the thus formed $\Delta^{1,3}$-androstadiene-3,17$\beta$-diol-3-benzyl ether in 17-position thereof with a lower aliphatic carboxylic acid, thereby forming the corresponding $\Delta^{1,3}$-androstadiene-3,17$\beta$-diol-3-benzyl ether-17-acylate.

9. The method which comprises reacting a compound of the formula:

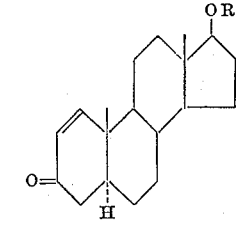

wherein R is selected from the group consisting of hydrogen and acyl wherein acyl is derived from a lower aliphatic carboxylic acid with benzyl alcohol in the presence of an alkali metal hydroxide, thereby forming $\Delta^{1,3}$-androstadiene-3,17β-diol-3-benzyl ether; and reacting the thus formed $\Delta^{1,3}$-androstadiene-3,17β-diol-3-benzyl ether with acetanhydride, thereby forming the corresponding $\Delta^{1,3}$-androstadiene-3,17β-diol-3-benzyl ether-17-acetate.

10. The method which comprises reacting a compound of the formula:

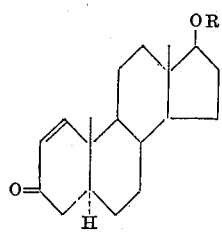

wherein R is selected from the group consisting of hydrogen and acyl wherein acyl is derived from a lower aliphatic carboxylic acid with benzyl alcohol in the presence of potassium hydroxide, thereby forming $\Delta^{1,3}$-androstadiene-3,17β-diol-3-benzyl ether; and reacting the thus formed $\Delta^{1,3}$-androstadiene-3,17β-diol-3-benzyl ether with acetanhydride, thereby forming the corresponding $\Delta^{1,3}$-androstadiene-3,17β-diol-3-benzyl ether-17-acetate.

References Cited by the Examiner

Dannenberg et al.: "Annalen Chem.," Vol. 646, August 1961, pages 154–156 relied on.

LEWIS GOTTS, *Primary Examiner.*
ELBERT L. ROBERTS, *Examiner.*